US012651213B2

(12) United States Patent
Carscallen et al.

(10) Patent No.: US 12,651,213 B2
(45) Date of Patent: Jun. 9, 2026

(54) OPTIMIZED CONTAINER LOADING USING A PACKAGE-POSITION SOLVER

(71) Applicant: Unisys Corporation, Blue Bell, PA (US)

(72) Inventors: William Mather Almon Carscallen, Blue Bell, PA (US); Tushar Satyendra Sashittal, Blue Bell, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 18/647,125

(22) Filed: Apr. 26, 2024

(65) Prior Publication Data

US 2025/0124364 A1     Apr. 17, 2025

(30) Foreign Application Priority Data

Oct. 16, 2023     (IN) .............................. 202311070268

(51) Int. Cl.
G06Q 10/04 (2023.01)
(52) U.S. Cl.
CPC ..................................... G06Q 10/04 (2013.01)
(58) Field of Classification Search
CPC ..................... G06Q 10/08355; G06Q 10/0834
USPC ................................................. 705/332, 338
See application file for complete search history.

(56) References Cited

U.S. PATENT DOCUMENTS

2006/0085299 A1* 4/2006 Goll ..................... G06Q 10/087
705/28
2022/0122031 A1* 4/2022 Powers ..................... B65B 5/12

OTHER PUBLICATIONS

"Secure Positioning for Shipping Containers in Ports and Terminals Using WSN" Published by IEEE (Year: 2014).*
Hajlaoui et al., "Deep Reinforcement Learning for Solving the Single Container Loading Problem", Engineering Optimization, vol. 55, No. 4, 2023, 18 pages.
International Search Report and Written Opinion received for PCT Patent Application No. PCT/US2024/051618, mailed on Jan. 22, 2025, 15 pages.
Zhao et al., "Learning Physically Realizable Skills for Online Packing of General 3D Shapes", ACM Transactions on Graphics, vol. 42, No. 5, Jul. 2023, 21 pages.

* cited by examiner

*Primary Examiner* — Zeina Elchanti

(74) *Attorney, Agent, or Firm* — Shook, Hardy & Bacon

(57) ABSTRACT

To determine the optimal orientation of packages within a container, packages are ranked according to a score defined by an algorithm. A first package position is determined from a first set of package dimensions and is oriented within a container. A second package position is determined from a second set of package dimensions and is oriented within the container. The packages are oriented such that the orientation of the first package position is different from the orientation of the second package position with no overlap, and a threshold portion of the lower face of the packages abuts another package or the container base. Packages are continuously oriented into the container volume until the total package volume reaches a threshold container volume, while minimizing the total package volume. The final orientation of the packages is output as a three-dimensional arrangement of the packages within the container volume.

20 Claims, 7 Drawing Sheets

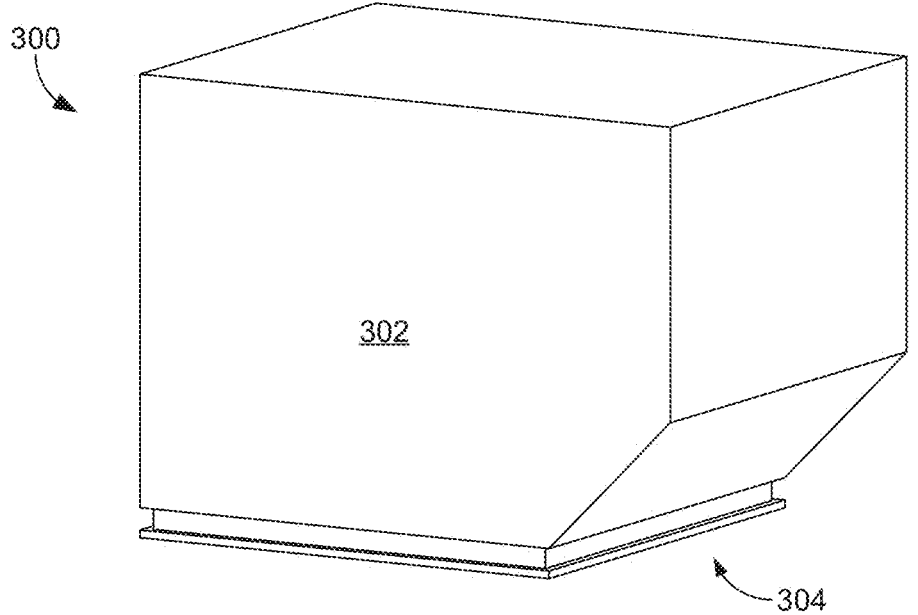
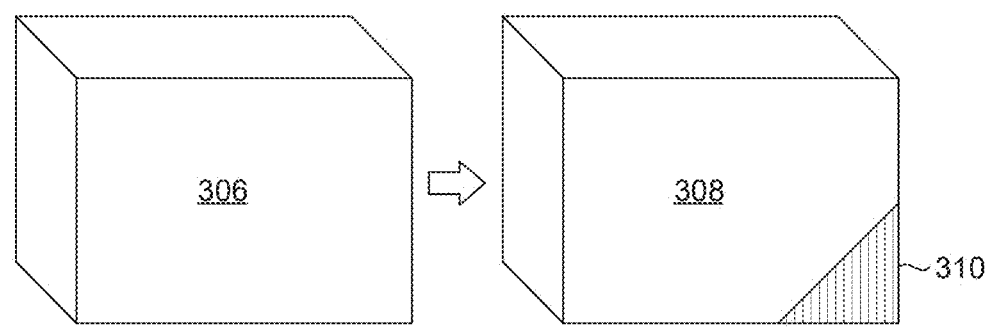
*FIG. 3*

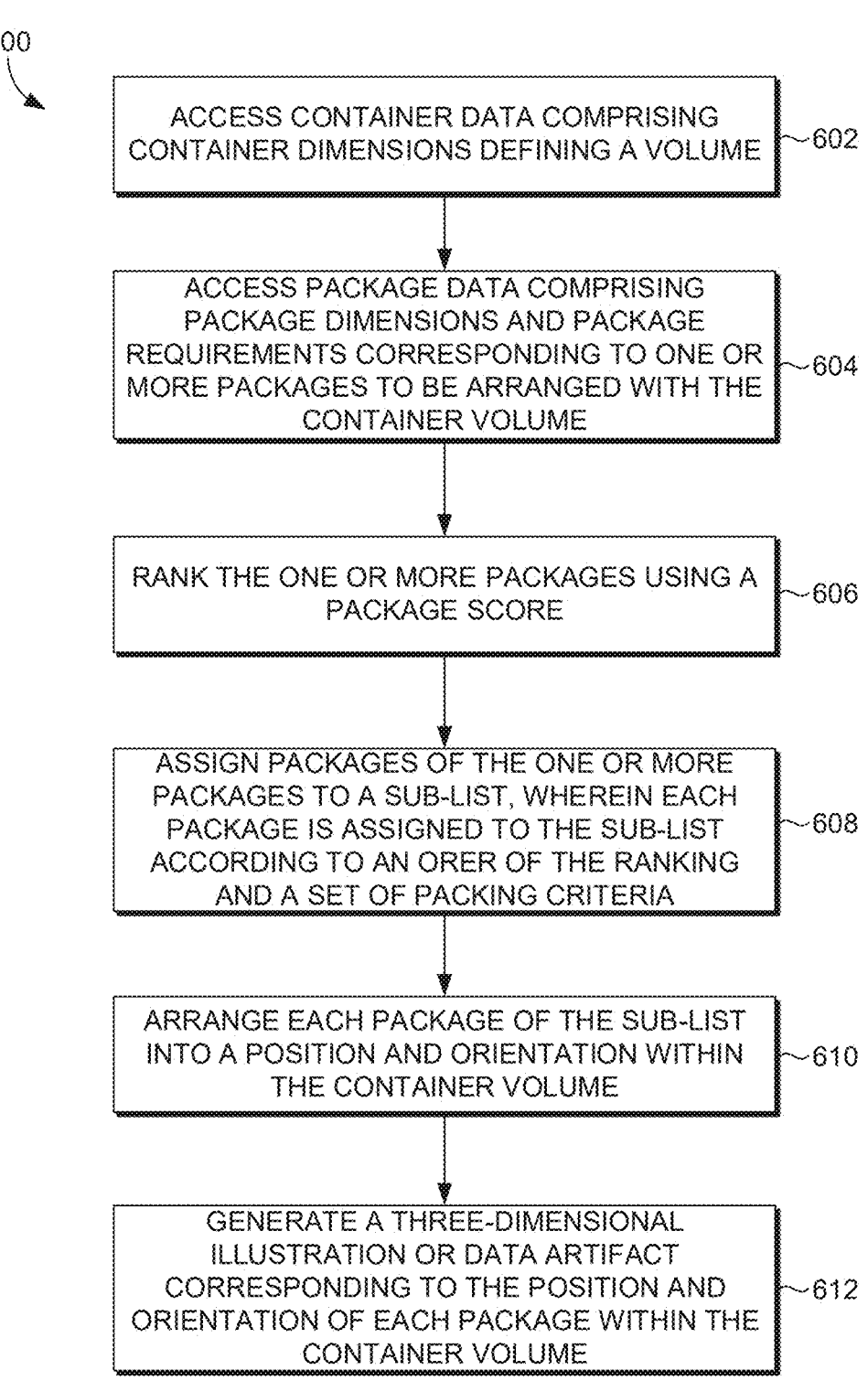

600

ACCESS CONTAINER DATA COMPRISING CONTAINER DIMENSIONS DEFINING A VOLUME  ~602

ACCESS PACKAGE DATA COMPRISING PACKAGE DIMENSIONS AND PACKAGE REQUIREMENTS CORRESPONDING TO ONE OR MORE PACKAGES TO BE ARRANGED WITH THE CONTAINER VOLUME  ~604

RANK THE ONE OR MORE PACKAGES USING A PACKAGE SCORE  ~606

ASSIGN PACKAGES OF THE ONE OR MORE PACKAGES TO A SUB-LIST, WHEREIN EACH PACKAGE IS ASSIGNED TO THE SUB-LIST ACCORDING TO AN ORER OF THE RANKING AND A SET OF PACKING CRITERIA  ~608

ARRANGE EACH PACKAGE OF THE SUB-LIST INTO A POSITION AND ORIENTATION WITHIN THE CONTAINER VOLUME  ~610

GENERATE A THREE-DIMENSIONAL ILLUSTRATION OR DATA ARTIFACT CORRESPONDING TO THE POSITION AND ORIENTATION OF EACH PACKAGE WITHIN THE CONTAINER VOLUME  ~612

OPTIMIZED CONTAINER LOADING USING A PACKAGE-POSITION SOLVER

CROSS-REFERENCE TO RELATED APPLICATIONS

This application claims the benefit of priority to Indian Patent Application number 202311070268, filed in the Indian Patent Office on Oct. 16, 2023, and entitled "Optimized Container Loading Using a Package Position Solver," the contents of which are hereby incorporated by reference in their entirety.

BACKGROUND

In the fields of logistics and transportation, packages must be arranged within containers for shipping. When determining how to arrange packages within a container, one must identify the optimal balance between optimizing space utilization, ensuring balanced weight distribution, facilitating ease of loading and unloading, ensuring inter-package compatibility, and more. These objectives, in turn, depend on numerous variables, such as the dimensions and shapes of the packages and the interior dimensions of the container.

SUMMARY

At a high level, the technology described herein relates to loading packages into containers for shipment. More specifically, a solver is provided that determines the optimal loading arrangement according to defined constraints for packages within containers. The solver may generate an output identifying locations within the containers at which packages are to be placed.

To do so, packages are scored based on any of several factors, such as priority, shipper importance, revenue per unit weight, and revenue per unit volume. The packages are ranked based on their respective scores and added to a package list. The package list is generated by assigning packages to the package list using the ranking and a set of packing criteria. A sub-list of the packages is created from the list for packing into a container.

A solver determines a packing configuration of the packages in the sub-list. The packages are oriented and positioned in a manner that satisfies several constraints, such as ensuring stability and avoiding overlap. The solver organizes the packages within the container in order to maximize space efficiency within the container. A three-dimensional representation illustrating the arrangement of the packages is generated, and the packages can be loaded accordingly.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 3 illustrates an example container, in accordance with an aspect described herein;

FIG. 6 illustrates an example method of optimized container loading using a package-position solver, in accordance with an aspect described herein;

DETAILED DESCRIPTION

Figure 1:
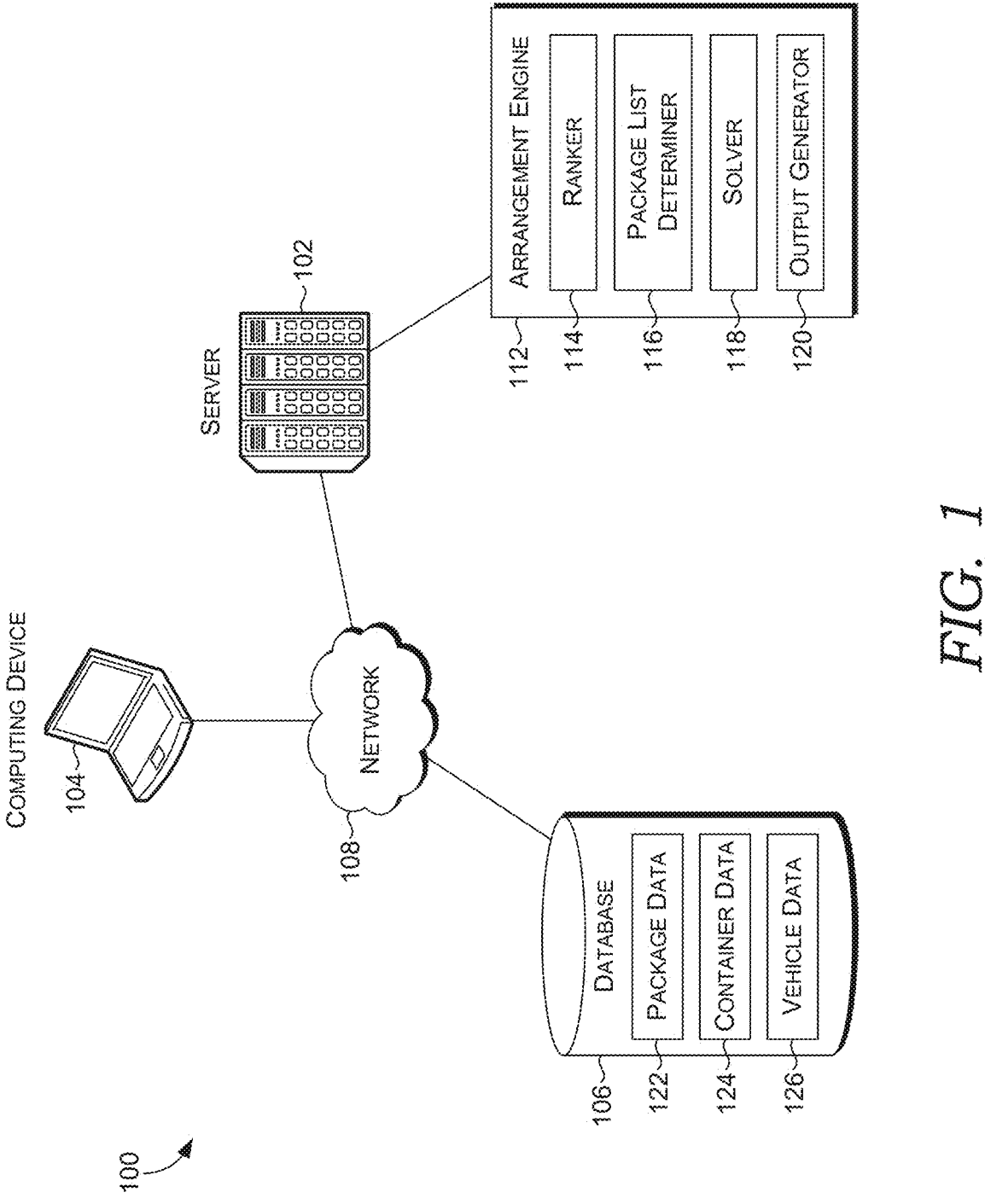
FIG. 1 illustrates an example operating environment in which aspects of the technology may be employed, in accordance with an aspect described herein.

Packages often must be loaded into containers to be shipped. Given the limited amount of space available in such containers, it is important to select and arrange packages in a manner that maximizes space utilization. Inefficient space utilization results in unnecessary transportation costs—e.g., both financial costs and greenhouse gas emissions. However, this task is so complex that it is often impossible to perform even with significant computational resources.

To illustrate, suppose there are 30 packages to be distributed between 3 containers. In this case, there are $3^{30}$—more than 205 trillion—possible ways to distribute the packages between the containers. But even this characterization significantly understates the task's complexity. First, in practice, there are often far more packages and containers. Second, each package must be positioned within its container, both rotationally and along x-y-z coordinates. Third, some packages are not compatible with other packages (e.g., a flammable package and an explosive package), and some packages are not compatible with some containers. Fourth, packages generally vary in shape, size, and weight. Due in part to such variations, many possible packing configurations are unstable. Fifth, in a commercial context, a shipper's business objectives must be taken into account. For example, packages should be delivered in a timely manner, "priority" packages should generally be shipped before non-priority packages, and packages should be selected in a manner that maximizes revenue.

To overcome these challenges, the technology described herein determines (a) which packages to load into which containers and (b) how to arrange packages within each container in a manner that is computationally efficient, maximizes packing density, and adheres to operational constraints. More particularly, the technology comprises a scoring system that prioritizes packages based on a weighted sum of several factors, such as shipping priority, shipper importance, and package revenue per unit volume and/or weight. The highest-priority packages are added to a sub-list for packing into a container, subject to several constraints, such as inter-package compatibility.

After the sub-list is determined, a solver determines an arrangement of the packages of the sub-list within a container. The solver loads information regarding both the container's shape and the packages' shapes and weights. The solver reduces the applicable search space by loading largest/heaviest packages first. As the solver iterates through possible packing configurations, it intelligently avoids package overlap, eliminates unstable configurations, and ensures inter-package compatibility. The packing process is repeated for each container. Leftover packages are slotted into any remaining space in the containers. Finally, a build plan is created that facilitates real-world container packing.

Some of the improvements to computational efficiency afforded by the described technology can be analogized to the operational improvements between two different methods of identifying a correct phone number for a particular name in a phone book. Here, a first method instructs a computer to begin at the start of the phone book. Each name is sequentially compared to the target name until a match is found. With a phone book containing a million names, this approach could necessitate up to a million operations depending on the location of the target name. A second method instructs the computer to select the median entry as the starting point. If the target name does not match, the search direction is determined by alphabetical order, halving the search area with each step. This approach significantly reduces the number of computer operations needed to find the target name, often requiring no more than 20 operations in a list of a million. In both methods, the computer's fundamental operation remains unchanged, the instructions it follows, however, enable it to navigate the solution space with few executable operations.

By analogy, generating a sub-list in a specific manner and utilizing it to assess the optimal arrangement of items in a container significantly decreases the number of operations the computer needs to perform relative to existing methods that explore the solution space by brute force. This not only expedites the search process but also enhances the computer's overall performance by allowing it to engage with a practically infinite solution space more effectively. By optimizing the search strategy, the computer is able to achieve a more optimal result with fewer operations, demonstrating a clear improvement in performance attributable to the method of instruction rather than to changes in the computer's hardware or basic capabilities.

It will be realized that the methods previously described are only examples that can be practiced from the description that follows and are provided to more easily understand the technology and recognize its benefits. Additional examples are now described with reference to the figures.

With reference now to FIG. 1, an example operating environment 100 in which aspects of the technology may be employed is provided. Among other components or engines not shown, operating environment 100 comprises server 102, computing device 104, and database 106, which communicate via network 108.

Database 106 generally stores information, including data, computer instructions (e.g., software program instructions, routines, or services), or models used in embodiments of the described technologies. Although depicted as a single database component, database 106 may be embodied as one or more databases or may be in the cloud. In aspects, database 106 is representative of a distributed ledger network.

Network 108 may include one or more networks (e.g., public network or virtual private network [VPN]), as shown with network 108. Network 108 may include, without limitation, one or more local area networks (LANs), wide area networks (WANs), or any other communication network or method.

Generally, server 102 is a computing device that implements functional aspects of operating environment 100, such as one or more functions of arrangement engine 112. One suitable example of a computing device that can be employed as server 102 is described as computing device 1000 with respect to FIG. 8. In implementations, server 102 represents a back-end or server-side device.

Computing device 104 is generally a computing device that may be used to interface with server 102. Computing device 104 may be used to provide package data 122, container data 124, and/or vehicle data 126 for determining optimal arrangements of packages within containers. In aspects, a three-dimensional representation of packages within a container is output at 104.

As with other components of FIG. 1, computing device 104 is intended to represent one or more computing devices. One suitable example of a computing device that can be employed as computing device 104 is described as computing device 1000 with respect to FIG. 8. In implementations, computing device 104 is a client-side or front-end device. While the example architecture illustrated in FIG. 1 illustrates functions of arrangement engine 112 being performed by server 102, it will be understood that this is just one example, and there may be more or fewer functions of arrangement engine 112, which may be employed in various orders.

It is further noted that, in some implementations of the technology, functions of arrangement engine 112 may be performed by other components of FIG. 1, or by components not show. As an example, in some implementations, computing device 104 may be used to perform functions of arrangement engine 112 in lieu of or in combination with server 102. The illustrated architecture is but one example used to aid in describing an aspect of the technology.

In general, arrangement engine 112 can be employed to determine an arrangement of packages within a container. In some cases, the arrangement of packages minimizes the amount of space in the container that are not occupied by the packages, while also adhering to various constraints described in more detail below. Arrangement engine 112 further provides stable packing arrangements that reduce the chance packages move or shift during transit.

As used herein, the term "package" refers to an item or a group of items designated to be transported from one location to another location. The term "package" encompasses any unit for transit, including a single unit or a group of units secured together.

Package data 122 may include data related to the packages to be packed in the container(s). In some aspects, package data comprises package dimensions, such as height, width, length, and/or any other measures of length or size that define a package's shape. Relatedly, package data 122 can further include package volumes. Providing the solver with data regarding package dimensions allows the solver to arrange packages in a manner that avoids package overlap, for example.

Package data 122 can also include package weight(s). Providing the solver with package weights allows the solver to arrange packages in stable configurations—for example, by generally positioning heavier packages at lower positions in containers. Additionally, in some applications, a container may be subject to a maximum weight threshold, so package weight data allows the solver to avoid over-packing containers.

Package data 122 can also include information regarding package contents and/or package handling requirements. One way of describing such information is special handling (SPL) codes. Common SPL codes include (among many others) "EAT," which indicates foodstuffs, and "PER," which corresponds to perishable cargo. SPL codes are important because, among other reasons, they can be indicative of inter-package compatibility. For example, safety regulations may prohibit packing explosives and certain chemical compounds in the same container. In another example, restrictions may prohibit certain goods in certain containers or on a particular vehicle type.

Package data 122 can further include shipping timing, route requirements, or shipper data—e.g., data regarding the package's value to the entity shipping the package. Shipper data can be determined and provided (and, in some aspects, dynamically modified) by a shipper. In some aspects, for a given package, shipper data comprises a priority score, a shipper importance score, a revenue per unit weight, and/or a revenue per unit volume. The priority score can be based on whether a recipient of the package paid for priority shipping and/or a date by which the package is to be delivered. The shipper importance score can be based on an importance of the package to the shipper. The revenue per unit weight and revenue per unit volume calculations can be determined by the server 102 (e.g., based on raw revenue, volume, and weight data for a package).

The foregoing examples are non-limiting, and it is contemplated that package data 122 can include any other type of data related to or descriptive of packages, such as package orientation requirements and crush or stack restrictions.

As used herein, the term "container" refers to a vessel designed to hold and transport goods (e.g., packages) by a vehicle, such as a land, sea, or air vehicle. For example, a container could be a unit load device (ULD), which is a container generally of standardized shape and/or size that facilitates easy loading and unloading from aircraft. In some cases, a container may include a portion of a vehicle, such as if the boundaries of the vehicle itself serve as the container in which packages are directly placed. In other cases, containers may have irregular shapes that are specific to transport by a particular type of vehicle.

Container data 124 may include data regarding the container(s) into which packages are to be loaded. In some aspects, container data 124 comprises container dimensions, such as height, width, length, and/or any other measures of length or size and a representation of irregular shapes (i.e., contours) that define a container's shape. Relatedly, container data 124 can further include container volumes.

Container data 124 may also include information regarding weight and/or volume constraints. That is, a container may be precluded from carrying more than a certain total weight of packages and/or a certain total volume of packages.

Container data 124 may also include information regarding SPL code compatibility. For example, container data for a heated container may comprise information indicating that the container is incompatible with packages that must be kept below a certain temperature (e.g., foodstuffs). In another example, container data for a temperature controlled or refrigerated container may comprise information indicating that the container is incompatible with packages that must be kept above a certain temperature. Container data 124 can further include other types of compatibility information, such as vehicle compatibility information—that is, information regarding types of vehicles with which the container is or isn't compatible.

The foregoing examples are non-limiting, and it is contemplated that container data 124 can include any other type of data related to or descriptive of containers.

Vehicle data 126 may include information regarding the vehicle(s) into which the containers are to be loaded for transportation. Like container data 124, vehicle data 126 can include dimensions and volume information (e.g., of the vehicle's cargo area(s)) and SPL compatibility information.

In some aspects, vehicle data 126 can also include maximum height, container compatibility, shape requirements, balancing requirements or positional maximum weight information—that is, a maximum weight that can be loaded into a certain position within the vehicle. For example, if the vehicle is an aircraft, the vehicle data 126 may indicate that a ULD located in a rearmost position of the aircraft's cargo bay must not exceed a maximum weight in order to avoid unbalancing the aircraft.

The foregoing examples are non-limiting, and it is contemplated that vehicle data 126 can include any other type of data related to or descriptive of vehicles.

Package data 122, container data 124, and vehicle data 126 may be provided and stored in database 106. In an aspect, the data is provided by computing device 104. Other components may provide this data as well. Arrangement engine 112 may access database 106 to retrieve package data 122, container data 124, and vehicle data 126 for use by its components in determining the arrangements of packages within containers, for example.

To determine an arrangement of packages within containers, the example arrangement engine 112 employs ranker 114, package list determiner 116, solver 118, and output generator 120. These components of the arrangement engine 112 are now briefly introduced. Operations executable by these components are further described below with respect to FIG. 3.

In general, ranker 114 scores packages and ranks packages based on their respective scores. Package may be ranked according to a score determined by an algorithm. The algorithm may provide a weighted sum of various parameters when ranking packages. Some example parameters include a shipment priority, customer level, revenue per unit weight, and revenue per unit volume.

Below provides one example algorithm that may be used by ranker 114 to rank packages for shipping via a container.

$$w_{p_i} + w_{c_i} + w_{rev_{W_i}} + w_{rev_{V_i}} = 1$$

$$rev_{W_i} = \frac{rev_i}{W_i}$$

$$rev_{V_i} = \frac{rev_i}{V_i}$$

$$\max_i = \max\left(p_i, c_i, rev_{W_i} \text{ and } rev_{V_i}\right)$$

$$p_{iN} = \left(\frac{p_i}{\max_i}\right) * 100$$

$$C_{iN} = \left(\frac{C_i}{\max_i}\right) * 100$$

$$rev_{W_iN} = \left(\frac{rev_{W_i}}{\max_i}\right) * 100$$

$$rev_{V_{iN}} = \left(\frac{rev_{V_i}}{\max_i}\right) * 100$$

$$score_i = \left(p_{iN} * W_{p_i}\right) + \left(C_{iN} * W_{c_i}\right) + \left(rev_{W_iN} * W_{rev_{W_i}}\right) + \left(rev_{V_{iN}} * W_{rev_{V_i}}\right)$$

| Variables | Description |
|---|---|
| i | Item or package from 0 to n, where n is the number of items on the flight |
| $score_i$ | Total score for package i |
| $p_i$ | Priority score for package i |
| $W_{p_i}$ | Weight of priority score for package i |
| $c_i$ | Customer importance score for package i |
| $W_{c_i}$ | Weight of customer importance score for package i |
| $rev_i$ | Revenue for package i |
| $W_i$ | Physical weight of package i |
| $rev_{W_i}$ | Revenue per unit (physical) weight for package i |
| $W_{revw_i}$ | Weight for revenue per unit (physical) weight for package i |
| $V_i$ | Volume for package i |
| $rev_{V_i}$ | Revenue per unit volume for package i |
| $W_{revv_i}$ | Weight for revenue per unit volume for package i |
| $max_i$ | $Max(p_i, c_i, rev_{W_i}, rev_{V_i})$ $p_i, c_i, rev_{W_i}, rev_{V_i}$ |
| $p_{iN}$ | Normalized priority score for package i |
| $C_{iN}$ | Normalized customer importance score for package i |
| $rev_{W_{iN}}$ | Normalized revenue per unit (physical) weight for package i |
| $rev_{V_{iN}}$ | Normalized revenue per unit volume for package i |

Package list determiner 116 generally determines a list of packages. The packages can be sorted within the list based on scores. The package list determiner 116 can also create a sub-list of packages to be loaded into a particular container. The sub-list can be a subset of the ranked packages in the list. The package list determiner 116 can continue adding packages to the sub-list until a packing threshold (e.g., approximately 70% container volume or weight utilization) is met.

In an example, package list determiner 116 generates the sub-list based on the ranking. In some cases, the package list determiner 116 generates the sub-list based on the ranking and one or more of a set of packing criteria. Some example packing criteria include (1) packing restrictions compliance with container or vehicle restrictions. For example, some items in the packages may not be suited for some containers. For instance, hazardous waste or chemicals might require certain containers, while items needing climate controls may be shipped in certain container types. (2) Packing restriction compliance between packages. That is, some items in package may have restrictions on what can be shipped in the same container. For example, certain chemicals may require shipment in separate containers. (3) Container door restrictions. Some containers may have enough volume, but the size restriction of packages being arranged within may be constrained by door requirements of the container. (4) Cumulative package weight. For instance, some containers have weight restrictions, and the packing criteria may include the cumulative packaging weight being less than the container weight restrictions. (5) Cumulative packing volume. For example, the container has a volume of space that can be occupied by packages. Packing criteria may include the total packaging volume being less than the container volume. Other criteria may be used as well. Any one or more criteria may be selected for by package list determiner 116 to determine the sub-list.

To determine whether a package restriction complies with a vehicle restriction. Package data for a package may be compared to vehicle data. Vehicle data may include, for example data related to a land, air, or sea vehicle, such as max vehicle weigh, volumes, dimensions, volume constraints, or other like data. Some vehicles include further restrictions on weight distribution, such as some aircraft, sea vessels, land cargo trailers, and so on. For these vehicles, vehicle data may also be positional in nature, and identify parameters by their position within the vehicle. As an example, aircraft data may include weight restrictions for different positions within the aircraft or weight distribution restrictions for distributing weight throughout different positions. This positional data may be provided for any vehicle type.

Package list determiner 116 may select from the ranked packages in the order of the ranking to generate the sub-list. As an example, package list determiner 116 may select the first ranked package. The first ranked package may be compared to any one or more of the set of packing criteria. If the first ranked package satisfied the selected criteria, it's added to the sub-list. Next, package list determiner 116 assesses the second ranked package. If the second ranked package satisfies the one or more packing criteria, the second ranked package is added to the sub-list. Ranked packages that do not satisfy the packing criteria may be excluded from the sub-list. Packages not meeting the criteria may be added back to the total packages to be considered for another sub-list or container. If a package does not satisfy the packing criteria, package list determiner 116 does not add it to the sub-list and assess the next package in sequential order of the ranking.

In aspects, package list determiner 116 can apply a machine learning model to select the packages for inclusion in the sub-list. The integration of machine learning (ML) complements the score based pre-sorting process for reducing the number of possible combinations considered by the solver. By utilizing historical success data and predictive modelling, this ML-component intelligently narrows down the myriad of cargo loading combinations, allowing the solver to focus on the most probable and efficient options for package placement within containers. In this regard, the use of machine learning in combination with the solver further improves the arrangement engine 112 because the combination more deeply explores the solution space by first applying a machine learning model to select the packages for inclusion in the sub-list and then leverages the solver to arrange the packages in the sub-list.

An extensive and diverse dataset may be collected. This dataset includes historical package loading configurations, package characteristics (e.g. dimensions, weight, etc.) and requirements, container requirements, vehicle requirements, and other relevant parameters. The richness of this dataset forms the basis for ML model training.

Data preprocessing techniques may be employed to extract features and patterns from the collected data. This step involves transforming raw data into a structured format that is suitable for ML training and testing.

Advanced ML algorithms, such as regression models, neural networks, or ensemble methods, are applied to the preprocessed data. In addition, or as an alternative, deep reinforcement learning models may be used. These models learn from historical data to identify patterns and relationships among variables. Specifically, positions within containers to maximize loading efficiency.

Once trained, the ML model becomes capable of making real-time cargo optimization recommendations. When a cargo loading scenario is presented, the system leverages these models to predict the most efficient package combinations and container positions. These recommendations are data-driven and based on historical success patterns and package-specific requirements. Furthermore, they can drastically reduce the number of combinations that the solver needs to consider when creating an optimal arrangement.

The ML-driven optimization process may undergo further or continuous learning. As new package data becomes available, the model are updated to refine predictions. This iterative learning process helps the systems provide recommendations even when packing data, vehicle data, and container data are updated.

The solver 118 determines an arrangement of packages from the sub-list within a container. In some aspects, the solver 118 adds the largest and/or heaviest packages from the sub-list first and positions those packages on a base (e.g., bottom surface) of the container. The solver 118 can consider a plurality of package configurations and select a configuration that is most volumetrically efficient.

For example, containers and packages can have positions in space that can be defined using a coordinate system. As an example, position in a three-dimensional space can be defined using three coordinates: x, y, and z, which represent distances along the horizontal, vertical, and depth axes, respectively.

Objects, such as container and packages, within space have dimensions defined by their length, width, and height. The position of an object can be represented by the coordinates of a specific point on or within the object. In aspect, the position of an object can be defined by the position of its volume as represented by its dimensions defined in terms of the coordinate system, such as x, y, and z. Using a simple example, if the object's dimensions are represented as L (length), W (width), and H (height), and its position is represented by the coordinates (x, y, z), the object occupies a space that extends from x to x+L along the x-axis, from y to y+W along the y-axis, and from z to z+H along the z-axis. Thus, in terms of position, the volume of the object is represented by all the points (x, y, z) that fall within the bounds defined by its dimensions and position coordinates.

When it comes to placing a package within a container, each package can be positioned based on its coordinates within the container's space. The position of the package can be defined by the coordinates of a specific reference point on the package (e.g., a corner or the center), and its orientation within the container can be determined by how its axes align with the axes of the container. This positional information, along with the dimensions of the package, defines a precise and known placement within the container.

A package may have faces, each of which is a portion of the outer surface area of the package. A package can have a lower face. The lower face of the package is intended to refer to the surface area of the package that is closest to the base or floor of its immediate environment or container. This face is defined by its boundary edges and corners, and its position can be specified using the coordinates in the three-dimensional space. The orientation and position of the lower face are subject to change if the package is reoriented.

As noted, solver 118 can be employed to determine a position of package within containers. In an aspect, solver 118 selects packages from the sub-list to position within a container. In an aspect, packages are selected from the sub-list based on weight. In another aspect, packages are selected from the sub-list based on weight and volume. In this way, relatively heavier packages are placed at a position within the container that is lower than relatively heavier items, thereby helping to stabilize the load.

In an aspect, a lower face of a package is positioned against a container base or against another package. In some cases a threshold portion of the lower face is positioned against the container base or another package. This provides a certain level of stability, helping to prevent packages from moving about the container during transit. For instance, the threshold portion may be 70% of the lower face. Thus, for instance, a threshold portion of a lower first face of the one package and a lower second face or another package each abuts a position of a container base or another package in the container.

As solver 118 considers the orientation of each package, solver determines there is no overlap between that packages. That is, the position of one package is different than another package. For instance, this may be done by determining that the coordinates of one package do not overlap with those of another package positioned within the container.

To efficiently handle overlap checks, solver 118 minimizes the number of checks by flagging sides of each package that are in contact with other packages. When placing a package, solver 118 consults these flags to identify potential areas with no overlap, then does a detailed overlap check only for those sides by comparing the coordinates of each package to determine they are different. This minimization strategy significantly reduces the computational effort required for overlap detection, making the packing process more efficient.

Further, solver 118 may minimize the total package volume of that packages when orienting the packages into their positions within the container. That is, the orientation that each package is positioned in seeks to minimize the overall package volume by the packages, thus more efficiently arranging the packages up to the container volume threshold.

Solver 118 can further be configured to determine the ideal rotation or orientation for each package before placing it. Packages are rotated along each of the three axes (x, y, z) ensuring the most efficient use of the container's internal volume and aligning packages to maximize the fit. Packages having orientation restrictions can be constrained to a particular orientation in the coordinate system, such as constrained to always have the same lower face, for example.

Having determined the arrangement of packages within one or more containers, output generator 120 may be used to output a representation of the arrangement(s). The output can be generated by extracting coordinates and/or orientation information corresponding to the placement of the packages within the container by the solver 118. The output can, for example, comprise package-loading instructions to facilitate the loading of packages into the container.

In other cases, there may be a three-dimensional graphical illustration of the container and the packages oriented therein according to the arrangement.

Output generator 120 may generate data artifact that can be used to generate an electronic document. This data artifact can also be consumed by a 3D visualizer and a range of automation technologies including but not limited to industrial robot arms, augmented reality devices and inventory management solutions. This step-by-step output provides a clear and visual representation of the solution. This output typically includes an image and details about each package and where it gets loaded inside the container relative to the other packages loaded before it. For instance, the coordinates output by output generator 120 may be used to render a three-dimensional display to show the location of a package within the container, which may be done in augmented or virtual reality. In another case, the output coordinates are used by robot arms or unmanned delivery system to place the packages within the container at the location specified by the coordinates.

In an aspect, after solver 118 has iterated to one or more containers and arranged the packages, it may attempt to fit all leftover packages into any container with the available space, given a set of packing conditions, such as the packing conditions previously described.

Figure 2:
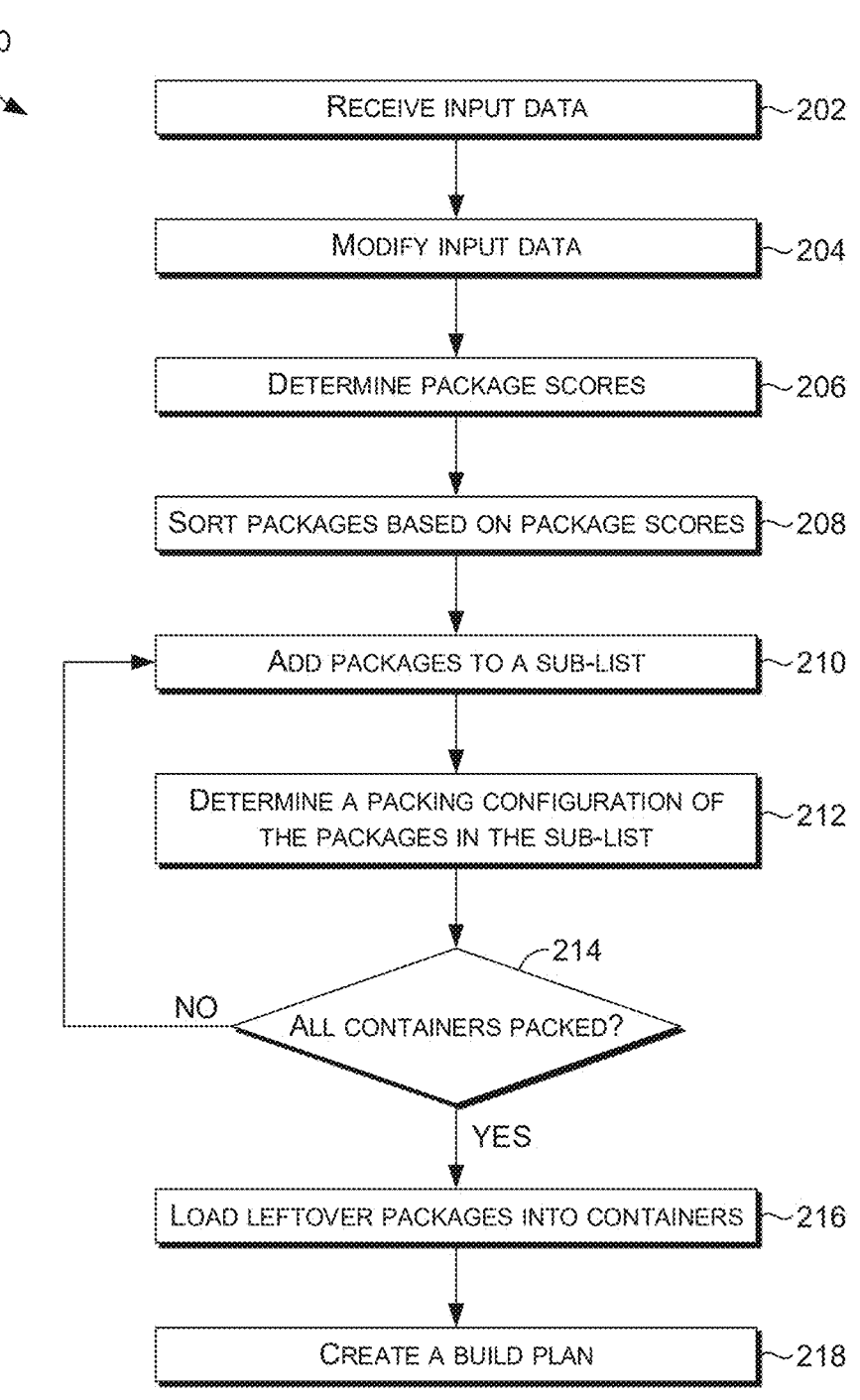
FIG. 2 illustrates a flow diagram of an example method performed using the technology, in accordance with an aspect described herein.

FIG. 2 provides a flow chart of an example process 200 that can be implemented by the described technology, including those components described with respect to FIG. 1. It is noted that this is one example process that can be practiced using the described technology. Other processes may be performed as well.

At step 202, input data is received. The input data may be in the form of a JSON file or any other suitable format. The input data can be retrieved from the database 106 by the server 102. The input data can comprise any of package data 122, container data 124, and vehicle data 126, each of which is described above. In some examples, the input data represents or corresponds to a shipment—e.g., a plurality of packages to be transported from a location.

At step 204, the input data is modified. The input data can be modified in either, both, or neither of the following two ways.

First, in some examples, package shapes and/or weights are modified. Package shapes can be modified by increasing each package's size/dimensions—e.g., by multiplying the package's dimensions by about 1.1 or 1.05-1.15. This approach provides a tolerance in case a package is larger than expected. Similarly, each package's weight can be increased—e.g., by multiplying the package's weight by about 1.1 or 1.05-1.15. However, it is contemplated that in some cases—e.g., when each package's weight and dimensions are known with a high degree of certainty—it may be unnecessary to upscale the dimensions and/or weights in this manner.

Second, in some examples, container shapes are modified. Containers can take on any number of shapes. Some common containers are rectangular prisms (i.e., boxes). Other containers have more irregular shapes that are comparatively difficult to define and/or are more computationally demanding to pack efficiently. To overcome these challenges, containers having irregular shapes (e.g., containers that are not rectangular prisms) can be represented as rectangular prisms having negative space.

To illustrate, FIG. 3 shows a process 300 of representing an irregularly-shaped container 302 as a rectangular prism having negative space. The input data—specifically, the container data—corresponding to the irregularly-shaped container 302 can be retrieved to determine the container's shape/contours. The container's edges can be extended or extrapolated to produce a box 306. In some aspects, the box 306 is the smallest rectangular prism that encloses the irregularly-shaped container 302. The shapes of the irregularly-shaped container 302 and the box 306 may differ only in that the box 306 includes the negative space 304 present in the irregularly-shaped container 302. The box can be modified by the arrangement engine 112 such that the space 304 is represented as an immovable object (e.g., a package) 310 within the box 308. Representing a container as a box with negative space rather than an irregularly-shaped object allows the solver 118 to position packages within containers in a faster, more computationally efficient manner, and allows for an infinite number of possible shapes that the container may take.

Returning to FIG. 2, at step 206, package scores are determined by the ranker 114. A score can be determined for each package. In general, each score may reflect the importance of shipping the corresponding package. Higher-scored packages are generally more likely to be shipped than lower-scored packages, which may not be shipped when the amount of available container space is insufficient.

The ranker 114 can determine package scores based on shipper data, for example. As previously described, for a given package, shipper data can comprise any of several sub-scores, such as a priority score, a customer importance score, a revenue per unit weight, and/or a revenue per unit volume.

In some aspects, the ranker 114 assigns a weight to each sub-score that comprises the shipper data. For example, if a shipment is relatively full, revenue per unit volume can be weighted higher than other sub-scores—e.g., to prioritize smaller, more valuable packages. The ranker 114 can determine the weights automatically or can use predetermined weights received as input data (e.g., from a shipper). The ranker 114 can determine a package score for each package based on the package's sub-scores and weights—e.g., by summing each of the weighted sub-scores.

Figure 4:
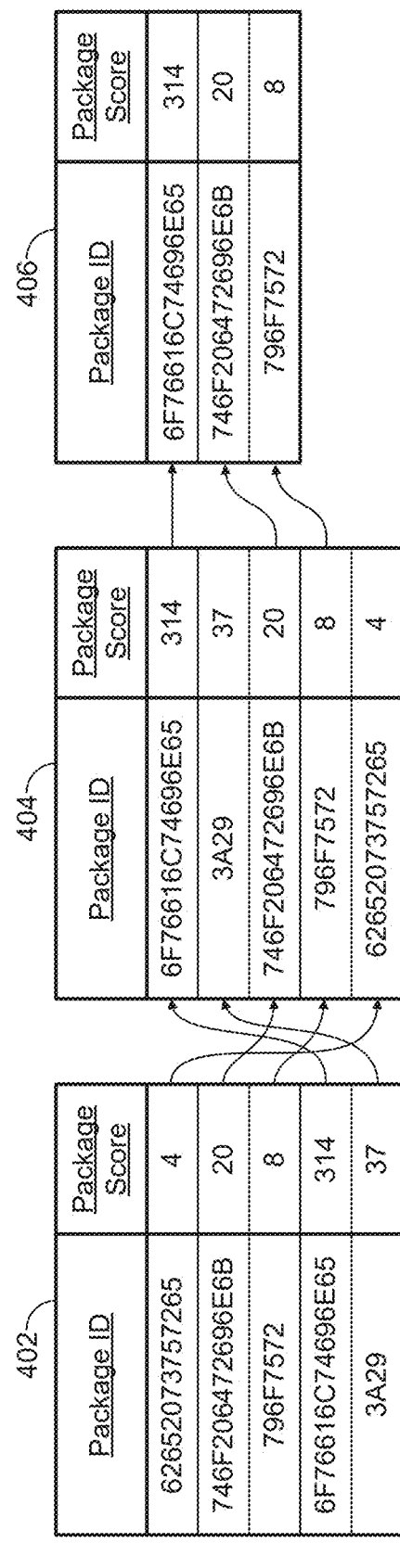
FIG. 4 illustrates an example method of scoring packages and creating sub-lists of packages, in accordance with an aspect described herein.

At step 208, the packages are added to a list and sorted based on their respective scores. And at step 210, packages from the list are added to a sub-list. An example method 400 that corresponds to steps 208 and 210 is shown in FIG. 4. Initially, each package is added to a list 402. The packages are sorted based on their respective scores, producing sorted list 404.

At a high level, the next step is to determine which packages to pack into a given container. Thus, the package list determiner 116 creates a sub-list 406 of packages to be added to a same container. As discussed, higher-scored packages—i.e., packages closer to the top of the sorted list 404—are generally higher priority. Thus, the package list determiner 116 generally begins at the top of the sorted list 404 (i.e., begins with the highest-scored package) and proceeds down the list, adding packages to the sub-list 406 until a container capacity threshold is met.

However, to, for example, ensure inter-package compatibility and package-container compatibility, sub-list 406 creation is subject to several constraints. If a package fails to satisfy any of the constraints, it is not added to the sub-list 406.

First, the package must be compatible with the container. One way of checking package-container compatibility is by checking the package's SPL code(s) for compatibility with the container. For example, if the package's SPL code indicates that the package must be heated but the container is a refrigerated container, the package and container are incompatible and the package will not be added to the sub-list 406.

Second, the package must be compatible with all other packages that have already been added to the sub-list 406 (if any). One way of checking inter-package compatibility is by checking the packages' respective SPL codes. Typically, the entity that issues the SPL codes will also provide information regarding which SPL codes are compatible with one another, so this check can be performed automatically. For example, a first package having an SPL code corresponding to explosives may be incompatible with a second package having an SPL code corresponding to flammable materials.

Third, the package is checked to ensure it can fit through the container's door (in aspects where the container has a door). This check can be performed based on the input data received at step 202 corresponding to (a) the package's shape/dimensions and (b) the shape/dimensions of the container's door.

Fourth, the package's weight is checked to ensure that adding the package will not cause the total weight of packages in the sub-list 406 to exceed the maximum weight the container is authorized to hold. Fifth, and similarly, the package's volume is checked to ensure that adding the package will not cause the total volume of packages in the sub-list 406 to exceed the total volume of the container.

The package list determiner 116 adds compatible packages to the sub-list 406 until a weight threshold of the container and/or a volume threshold of the container is met. One suitable weight/volume threshold is approximately 70% (e.g., 60-80%) of the maximum weight/volume the container can hold. Halting the sub-list-creation process before reaching 100% weight/volume utilization leaves room for additional packages to be added to the container at step 216, which is discussed below.

At step 212, the solver 118 determines a packing configuration of the packages in the sub-list 406. Put another way, the solver 118 arranges the packages within the container in a manner that seeks to maximize stability and space efficiency, for example.

Figure 5:
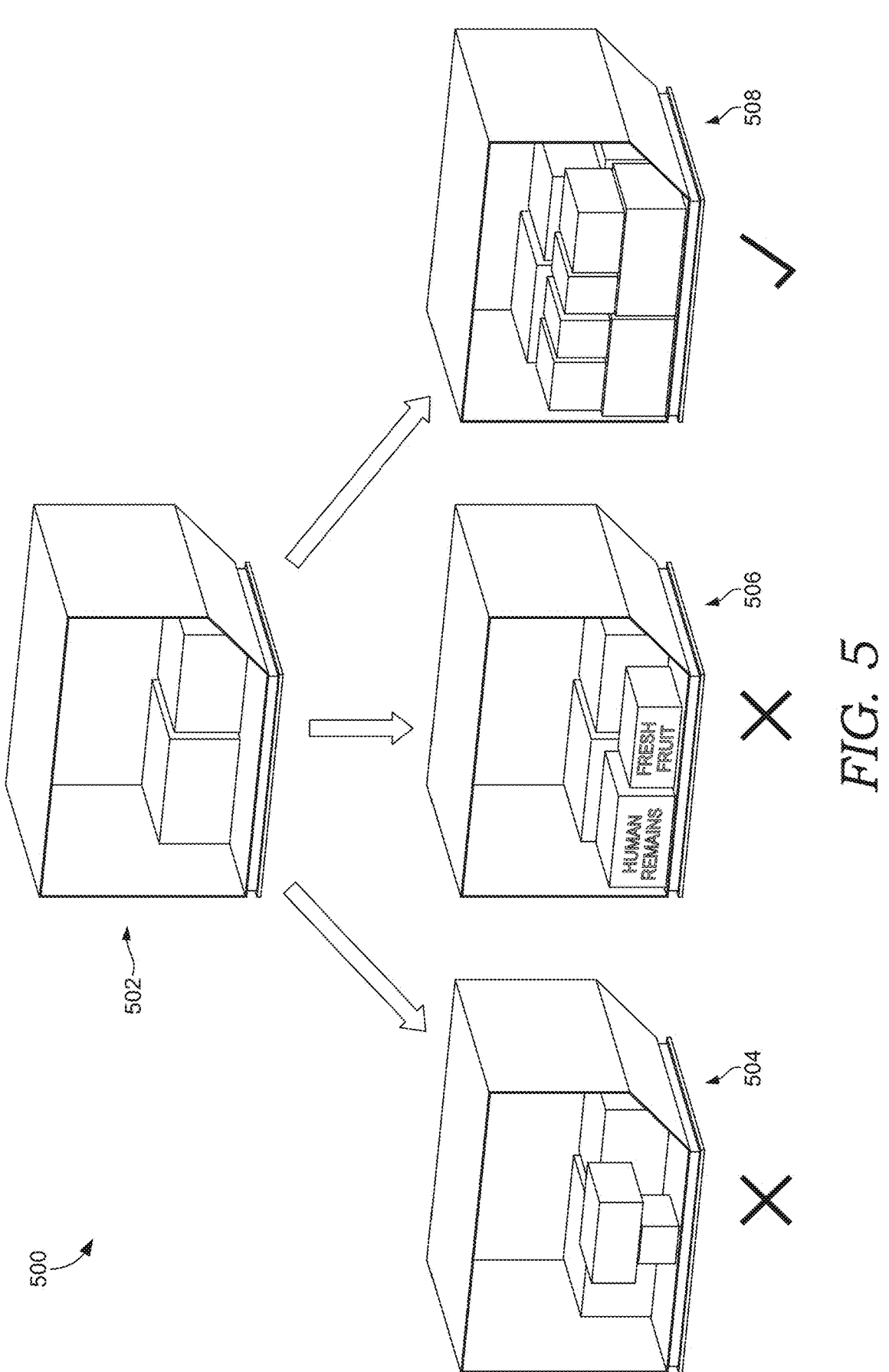
FIG. 5 illustrates an example method of packing containers with packages, in accordance with an aspect described herein.

An example method 500 executable by the solver 118 is generally illustrated in FIG. 5. Generally, the most stable packing configurations are those in which largest/heaviest packages are positioned at the bottom of a container. Thus, initially, the solver 118 identifies one or more of the largest and/or heaviest packages in the sub-list 406 and positions those packages on a base (e.g., bottom surface) of the container, as shown in configuration 502. This approach also narrows the search space (i.e., reduces the total number of configurations) the solver 118 must consider.

As each package is added to the container, the solver 118 performs checks to ensure that the package does not overlap with any other package. Rather than checking every package against every other package, the solver 118 flags sides of packages that are already in contact with other packages. When placing a package, the solver 118 consults these flags to identify potential areas with no overlap and performs a detailed overlap check only for those sides. By minimizing the checks, the computational effort required for overlap detection can be significantly reduced, making the overall packing process more efficient.

Further, as each package is added to the container, the package is checked by the solver 118 to ensure stable placement. In some aspects, if a package is placed on top of one or more other packages, the solver 118 checks whether at least a certain percentage (e.g., at least 70%) of a bottom surface of the package is supported by (e.g., positioned directly adjacent to) one or more other packages. To illustrate, configuration 504 shows an insufficiently stable stack of packages. This configuration 504 would be rejected by the solver 118, which would proceed to check other configurations.

Moreover, as each package is added to the container, the package can be checked to ensure compatibility with adjacent packages. Compatibility can be assessed by comparing the package's SPL code(s) to SPL code(s) of adjacent packages. To illustrate, as shown in configuration 506, if a first package's SPL code indicates that the first package contains fresh fruit and a second package's SPL code indicates that the second package contains human remains, the solver 118 may reject the configuration 506 and instead attempt to place one or both of the incompatible packages in another location within the container.

Further, as each package is added to the container, the package is rotated along x, y, and z axes to check different package orientations to determine optimal fit. The solver 118 prefers package configurations that align packages to maximize the fit and ensure the most efficient use of the internal volume of the container. The solver 118 repeats this process for all packages in the sub-list 406, which produces a configuration 508 that is both stable and efficiently packed.

Returning now to FIG. 2, as discussed, the input data received at step 202 may comprise a plurality of containers into which packages are to be packed—e.g., a plurality of containers that comprise a shipment to be transported by a vehicle. Thus, following step 212, at step 214, the arrangement engine 112 checks whether all containers have been packed. If not, the method 200 returns to step 210. A second sub-list is created for a second container (step 210), a second packing configuration is determined by the solver 118 for the second container, and so on until all containers are packed.

Once all containers have been packed, at step 216, left-over packages are loaded into containers. That is, the solver 118 attempts to place packages in the list 404 that have not been placed in any container into any remaining empty space in the container(s). These packages are subject to the same constraints previously discussed—e.g., stability, SPL code compatibility, and container weight limits.

At step 218, the output generator 120 creates a build plan. The build plan is a data artifact, electronic document, or illustration that indicates the configuration(s) determined by the solver 118. In some aspects, the build plan comprises step-by-step instructions for loading the packages into the containers to achieve the configuration(s) determined by the solver 118. In some aspects, these instructions are machine-executable (e.g., robot-executable) instructions capable of causing an automated system to load the packages into the container(s) in the configuration(s) determined by the solver 118. The build plan can be communicated (e.g., by the server 102) to the computing device 104 for execution of the build plan.

With reference to FIG. 6, a block diagram is provided illustrating method 600. Each block of the method 600 may comprise a computing process performed using any combination of hardware, firmware, or software. For instance, various functions can be carried out by a processor executing instructions stored in memory. The method can also be embodied as computer-usable instructions stored on computer storage media. The method can be provided by a standalone application, a service or hosted service (standalone or in combination with another hosted service), or a plug-in to another product, to name a few possibilities. Method 600 may be implemented in whole or in part by components of operating environment 100.

At block 602, container data is accessed. The container data may comprise container dimensions defining a container volume;

At block 604, package data is accessed. The package data may comprise package dimensions and package requirements corresponding to one or more packages to be arranged within the container volume.

At block, 606, the one or more packages are ranked using a package score. For example, the packages may be ranked using ranker 114.

At block 608, packages of the one or more packages are assigned to a sub-list. Each package is assigned to the sub-list according to an order of the ranking and a set of packing criteria. In an aspect, the set of packing criteria comprises at least one of: packaging requirements for each package are compatible with container requirements; packaging requirements for each package are compatible with packing requirements of other packages on the sub list; package dimensions are less than container door dimensions; cumulative packing weight of packages on the sub list is less than maximum packing weight for the container; and cumulative packing volume is less than a volume of the container. Packages may be assigned to the packing list using package list determiner 116. Package list determiner 116 may assign packages from the ranking to the packing list until a total volume of the packages on the packing list is greater than a threshold container volume. This reduces the number of packages overall to the maximum amount of packages that could be included into the container without exceeding the threshold container volume, thereby reducing the number of computations the model has to make. This allows the model to be faster and explore more of the solution space than prior models, although not all packages may be in the final arrangement.

At block 610, each package of the sub-list is arranged into a position and orientation within the container volume. For example, this may be performed by solver 118.

At block 612, a three-dimensional illustration or data artifact corresponding to the position and orientation of each package within the container volume is generated. This may be performed using output generator 120. In aspects, packages are continually oriented from the packing list into the container until the total package volume is greater than a threshold container volume. In some cases, because of the arrangement, there is the possibility that all of the packages will not fit, although the total volume is equal to the threshold. Remaining packages can be put back into a pool for placement in other containers.

Figure 7:
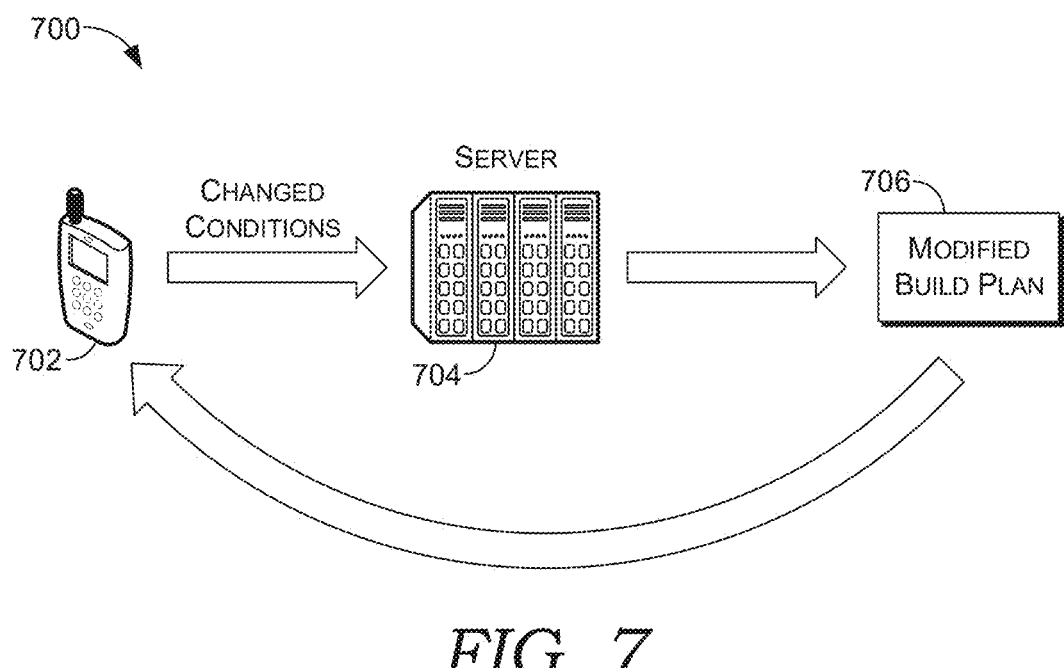
FIG. 7 illustrates an example method of updating a build plan based on changed conditions, in accordance with an aspect described herein.

Turning now to FIG. 7, in some cases, it may be preferable or necessary to modify the build plan. For example, if the input data received at step 202 does not accurately represent package or container dimensions (for example), it may be difficult or impossible to load packages into a container in the configuration determined by the solver 118. In such cases (among others), a computing device 702 can transmit information regarding changed conditions to a server 704. The computing device 702 may correspond to the computing device 104, and the server 704 may correspond to the server 102.

The communication regarding the changed conditions can comprise a real-time update or modification to any of the input data received at step 202. Such a modification can comprise, for example, a modification to a weight of a package, a modification to dimensions of a package, and/or a modification to any other type of input data discussed herein. As another example, the communication can be an indication that a package is missing or damaged and thus cannot be shipped (e.g., should be deleted from the input data). In yet another example, the communication can comprise a real-time change in external factors (e.g., weather).

The communication from the computing device 702 can cause the server 704 (including the arrangement engine 112, in some aspects) to create a modified build plan 706, in real-time, based on the modification(s) to the input data. In some cases, it may be necessary for the arrangement engine 112 to re-execute the method 200 based on the modified input data. The server 704 can transmit the modified build plan 706 back to the computing device 702 for execution of the modified build plan.

Figure 8:
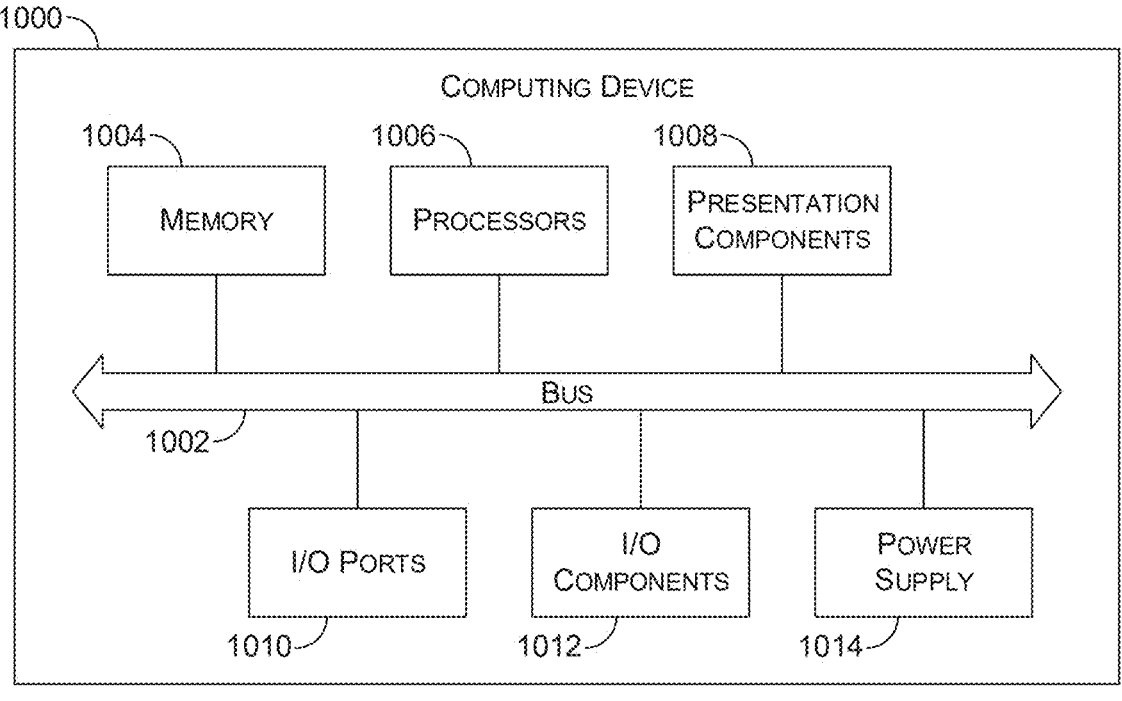
FIG. 8 is an example computing device suitable for implementing aspects of the technology, in accordance with an aspect described herein.

Having described an overview of some embodiments of the present technology, an example computing environment in which embodiments of the present technology may be implemented is described below in order to provide a general context for various aspects of the present technology. Referring now to FIG. 8 in particular, an example operating environment for implementing embodiments of the present technology is shown and designated generally as computing device 1000. Computing device 1000 is but one example of a suitable computing environment and is not intended to suggest any limitation as to the scope of use or functionality of the technology. Computing device 1000 should not be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant or other handheld device. Generally, program modules, including routines, programs, objects, components, data structures, etc., refer to code that performs particular tasks or implements particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 8, computing device 1000 includes bus 1002, which directly or indirectly couples the following devices: memory 1004, one or more processors 1006, one or more presentation components 1008, input/output (I/O) ports 1010, input/output components 1012, and illustrative power supply 1014. Bus 1002 represents what may be one or more buses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 8 is merely illustrative of an example computing device that can be used in connection with one or more embodiments of the present technology. Distinction is not made between such categories as "workstation," "server," "laptop," "handheld device," etc., as all are contemplated within the scope of FIG. 8 and with reference to "computing device."

Computing device 1000 typically includes a variety of computer-readable media. Computer-readable media can be any available media that can be accessed by computing device 1000 and includes both volatile and non-volatile media, and removable and non-removable media. By way of example, and not limitation, computer-readable media may comprise computer storage media and communication media. Computer storage media, also referred to as a communication component, includes both volatile and non-volatile, removable and non-removable media implemented in any method or technology for storage of information, such as computer-readable instructions, data structures, program modules, or other data. Computer storage media includes, but is not limited to, RAM, ROM, EEPROM, flash memory, or other memory technology; CD-ROM, digital versatile disks (DVDs), or other optical disk storage; magnetic cassettes, magnetic tape, magnetic disk storage, or other magnetic storage devices; or any other medium that can be used to store the desired information and that can be accessed by computing device 1000. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 1004 includes computer-storage media in the form of volatile or non-volatile memory. The memory may be removable, non-removable, or a combination thereof. Example hardware devices include solid-state memory, hard drives, optical-disc drives, etc. Computing device 1000 includes one or more processors that read data from various entities, such as memory 1004 or I/O components 1012. Presentation component(s) 1008 presents data indications to a user or other device. Example presentation components include a display device, speaker, printing component, vibrating component, etc.

I/O ports 1010 allow computing device 1000 to be logically coupled to other devices, including I/O components 1012, some of which may be built in. Illustrative components include a microphone, joystick, game pad, satellite dish, scanner, printer, wireless device, etc. The I/O components 1012 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition, both on screen and adjacent to the screen, as well as air gestures, head and eye tracking, or touch recognition associated with a display of computing device 1000. Computing device 1000 may be equipped with depth cameras, such as stereoscopic camera systems, infrared camera systems, RGB (red-green-blue) camera systems, touchscreen technology, other like systems, or combinations of these, for gesture detection and recognition. Additionally, the computing device 1000 may be equipped with accelerometers or gyroscopes that enable detection of motion. The output of the accelerometers or gyroscopes may be provided to the display of computing device 1000 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low-level software written in machine code; higher-level software, such as application software; and any combination thereof. In this regard, functional components of FIG. 1 can manage resources and provide the described functionality. Any other variations and combinations thereof are contemplated within embodiments of the present technology.

With reference briefly back to FIG. 1, it is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1, such as those described in relation to 112, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory, such as database 106. Moreover, functions of 112, among other functions, may be performed by server 102, computing device 104, or any other component, in any combination.

Referring to the drawings and description in general, having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including," "having," and other like words and their derivatives have the same broad meaning as the word "comprising," and the word "accessing" comprises "receiving," "referencing," or "retrieving," or derivatives thereof. Further, the word "communicating" has the same broad meaning as the word "receiving," or "transmitting," as facilitated by software or hardware-based buses, receivers, or transmitters" using communication media described herein.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment. However, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated by the accompanying drawings is to be interpreted as illustrative and not in a limiting sense.

Some aspects of the technology that may be practice from the foregoing description include, but are not limited to, the following:

Aspect 1: A computerized method comprising: accessing container data comprising container dimensions defining a container volume; accessing package data comprising package dimensions and package requirements corresponding to one or more packages to be arranged within the container volume; ranking the one or more packages using a package score; assigning packages of the one or more packages to a sub-list, wherein each package of is assigned to the sub-list according to an order of the ranking and a set of packing criteria; arranging packages of the sub-list into a position and orientation within the container volume; and generating a three-dimensional illustration or data artifact corresponding to the position and orientation of each package within the container volume.

Aspect 2: One or more computer storage media storing computer-readable instructions thereon that when executed by a processor cause the processor to perform operations comprising: accessing container data comprising container dimensions and irregular shapes defining a container volume; accessing package data comprising package dimensions and package requirements corresponding to one or more packages to be arranged within the container volume; ranking the one or more packages using a package score; assigning packages of the one or more packages to a sub-list, wherein each package of is assigned to the sub-list according to an order of the ranking and a set of packing criteria, wherein packages are assigned to the sub-list until a total weight of the packages is greater than a threshold portion of a maximum packing weight for the container and a total volume of the packages is greater than a threshold portion of a container volume; arranging packages of the sub-list into a position and orientation within the container volume; and generating a three-dimensional illustration or data artifact corresponding to the position and orientation of each package within the container volume.

Aspect 3: A system comprising: at least one processor; and one or more computer storage media storing computer readable instructions thereon that when executed by the at least one processor cause the at least one processor to perform operations comprising: accessing container data comprising container dimensions defining a container volume; modifying the container dimensions to define a rectangular prism; defining a volume of negative space created when modifying the container dimensions, wherein the rectangular prism is defined based on maximum dimensions for the container; accessing package data comprising package dimensions and package requirements corresponding to one or more packages to be arranged within the container volume; ranking the one or more packages using a package score; assigning packages of the one or more packages to a sub-list, wherein each package is assigned to the sub-list according to an order of the ranking and a set of packing criteria; arranging each package of the sub-list into a position and orientation within the container volume; and generating a three-dimensional illustration or data artifact corresponding to the position and orientation of each package within the container volume.

Aspect 4: Any of Aspects 1-3, wherein the position and orientation of a first package is different from the orientation and position of the second package within the container volume.

Aspect 5: Any of Aspects 1-4, wherein a threshold portion of a lower first face of the first package and a second lower face of the second package each abuts a position of a container base or another package.

Aspect 6: Any of Aspects 1-5, wherein the position and orientation of the arranged packages of the sub-list maximizes a total package position within the container volume.

Aspect 7: Any of Aspects 1-6, wherein the set of packing criteria comprises at least one of: packaging requirements for each package are compatible with container requirements; packaging requirements for each package are compatible with package requirements of other packages on the sub-list; package dimensions are compatible with loading the package into the container; cumulative packing weight of packages on the sub-list is less than maximum packing weight for the container; and cumulative packing volume is less than the container volume.

Aspect 8: Any of Aspects 1 or 3-7, wherein packages are assigned to the sub-list until a total weight of the packages is greater than a threshold portion of a maximum packing weight for the container.

Aspect 9: Any of Aspects 1-8, wherein packages are assigned to the sub-list until a total volume of the packages is greater than a threshold portion of a container volume.

Aspect 10: Any of Aspects 1-9, further comprising, continuously arranging packages from the sub-list until the total volume is greater than a threshold container volume.

Aspect 11: Any of Aspects 1-2 or 4-10, further comprising: modifying the container dimensions to define a rectangular prism; and defining a volume of negative space created when modifying the container dimensions.

What is claimed is:

1. A computerized method comprising:
accessing, by a processor, container data comprising container dimensions defining a container volume;
accessing, by the processor, package data comprising package dimensions and package requirements corresponding to one or more packages to be arranged within the container volume;
ranking, by the processor, the one or more packages using a package score;
assigning, by the processor, packages of the one or more packages to a sub-list, wherein each package of is assigned to the sub-list according to an order of the ranking and a set of packing criteria;
arranging, by the processor, packages of the sub-list into a position and orientation within the container volume, wherein the position and orientation of the packages are adjusted to avoid package overlap until the coordinates of each package do not overlap with the coordinates of another package positioned within the container; and
generating, by the processor, a three-dimensional illustration or data artifact corresponding to the position and orientation of each package within the container volume, wherein the data artifact includes step-by-step instructions for placing the packages within the container based on the coordinates of each package and the position and orientation of each package inside the container relative to other packages;
packing, by the processor, the container by transmitting machine-executable instructions to an automated system causing the automated system to load the packages into the container based on the data artifact.

2. The method of claim 1, wherein the position and orientation of a first package is different from the orientation and position of the second package within the container volume.

3. The method of claim 2, wherein a threshold portion of a lower first face of the first package and a second lower face of the second package each abuts a position of a container base or another package.

4. The method of claim 3, wherein the position and orientation of the arranged packages of the sub-list maximizes a total package position within the container volume.

5. The method of claim 1, wherein the set of packing criteria comprises at least one of:
packaging requirements for each package are compatible with container requirements;
packaging requirements for each package are compatible with package requirements of other packages on the sub-list;
package dimensions are compatible with loading the package into the container;
cumulative packing weight of packages on the sub-list is less than maximum packing weight for the container; and
cumulative packing volume is less than the container volume.

6. The method of claim 1, wherein packages are assigned to the sub-list until a total weight of the packages is greater than a threshold portion of a maximum packing weight for the container.

7. The method of claim 1, wherein packages are assigned to the sub-list until a total volume of the packages is greater than a threshold portion of a container volume.

8. The method of claim 1, further comprising, continuously arranging packages from the sub-list until the total volume is greater than a threshold container volume.

9. The method of claim 1, further comprising:
modifying the container dimensions to define a rectangular prism; and
defining a volume of negative space created when modifying the container dimensions.

10. The method of claim 9, wherein the rectangular prism is defined based on maximum dimensions for the container.

11. One or more computer storage media storing computer-readable instructions that when executed by a processor, cause the processor to perform operations, the operations comprising:
accessing container data comprising container dimensions and irregular shapes defining a container volume;
accessing package data comprising package dimensions and package requirements corresponding to one or more packages to be arranged within the container volume;
ranking the one or more packages using a package score;
assigning packages of the one or more packages to a sub-list, wherein each package is assigned to the sub-list according to an order of the ranking and a set of packing criteria, wherein packages are assigned to the sub-list until a total weight of the packages is greater than a threshold portion of a maximum packing weight for the container and a total volume of the packages is greater than a threshold portion of a container volume;
arranging packages of the sub-list into a position and orientation within the container volume, wherein the position and orientation of the packages are adjusted to avoid package overlap until the coordinates of each package do not overlap with the coordinates of another package positioned within the container;
generating a three-dimensional illustration or data artifact corresponding to the position and orientation of each package within the container volume, wherein the data artifact includes step-by-step instructions for placing the packages within the container based on the coordinates of each package and the position and orientation of each package inside the container relative to other packages; and
packing the container by transmitting machine-executable instructions to an automated system causing the automated system to load the packages into the container based on the data artifact.

12. The media of claim 11, wherein the position and orientation of a first package is different from the orientation and position of the second package within the container volume.

13. The media of claim 12, wherein a threshold portion of a lower first face of the first package and a second lower face of the second package each abuts a position of a container base or another package.

14. The media of claim 13, wherein the position and orientation of the arranged packages of the sub-list maximizes a total package position within the container volume.

15. The media of claim 11, wherein the set of packing criteria comprises at least one of:

packaging requirements for each package are compatible with container requirements;

packaging requirements for each package are compatible with package requirements of other packages on the sub-list;

package dimensions are less than container door dimensions;

cumulative packing weight of packages on the sub-list is less than maximum packing weight for the container; and cumulative packing volume is less than a volume of the container.

16. The media of claim 11, further comprising:

modifying the container dimensions to define a rectangular prism; and defining a volume of negative space created when modifying the container dimensions.

17. The media of claim 16, wherein the rectangular prism is defined based on maximum dimensions for the container.

18. A system comprising:

at least one processor; and one or more computer storage media storing computer-readable instructions that when executed by the at least one processor, cause the at least one processor to perform operations comprising:

accessing container data comprising container dimensions defining a container volume;

modifying the container dimensions to define a rectangular prism;

defining a volume of negative space created when modifying the container dimensions, wherein the rectangular prism is defined based on maximum dimensions for the container;

accessing package data comprising package dimensions and package requirements corresponding to one or more packages to be arranged within the container volume;

ranking the one or more packages using a package score;

assigning packages of the one or more packages to a sub-list, wherein each package is assigned to the sub-list according to an order of the ranking and a set of packing criteria;

arranging each package of the sub-list into a position and orientation within the container volume, wherein the position and orientation of the packages are adjusted to avoid package overlap until the coordinates of each package do not overlap with the coordinates of another package positioned within the container;

generating a three-dimensional illustration or data artifact corresponding to the position and orientation of each package within the container volume, wherein the data artifact includes step-by-step instructions for placing the packages within the container based on the coordinates of each package and the position and orientation of each package inside the container relative to other packages; and packing the container by transmitting machine-executable instructions to an automated system causing the automated system to load the packages into the container based on the data artifact.

19. The system of claim 18, wherein packages are assigned to the sub-list until a total weight of the packages is greater than a threshold portion of a maximum packing weight for the container.

20. The system of claim 18, wherein packages are assigned to the sub-list until a total volume of the packages is greater than a threshold portion of a container volume.

* * * * *